Sept. 21, 1971                H. F. RUSSELL                3,606,628
                    TABLE MOUNTABLE MEAT CLEANING MACHINE
Filed Nov. 17, 1969                                    4 Sheets-Sheet 1
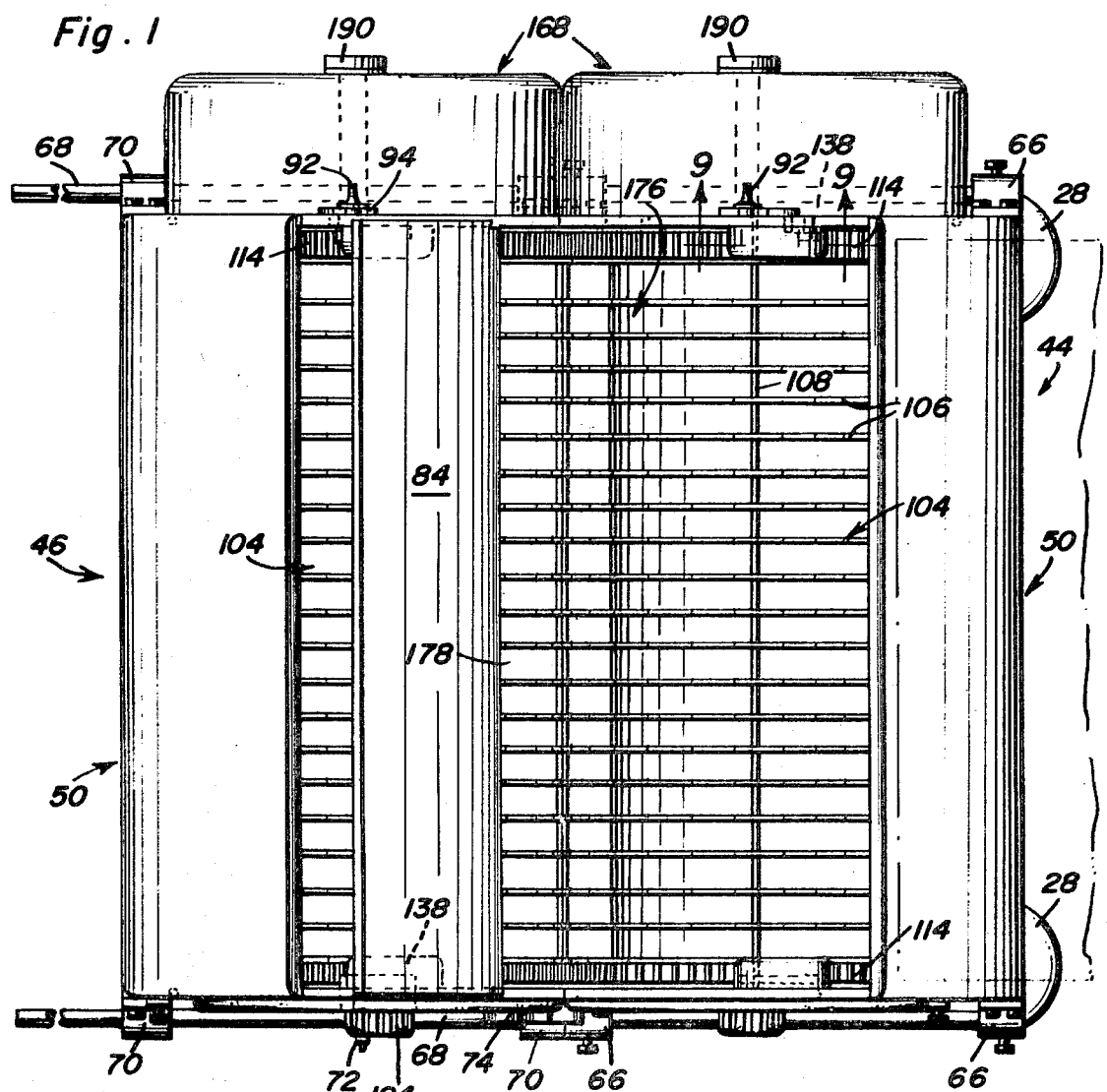
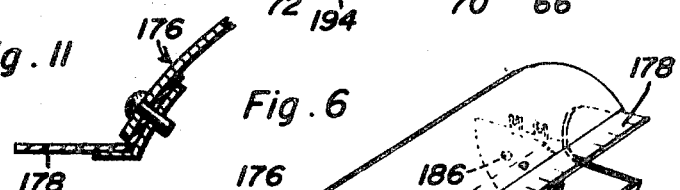
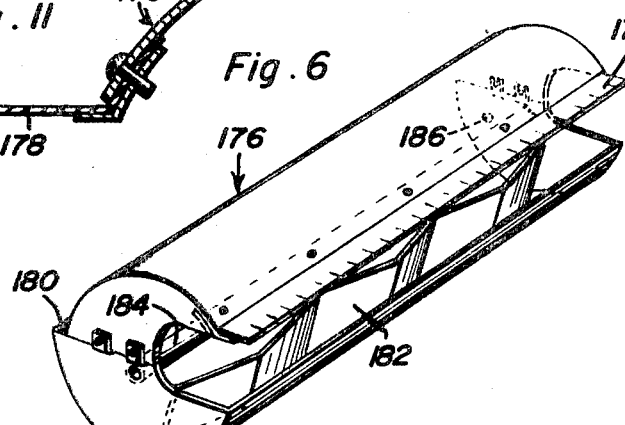
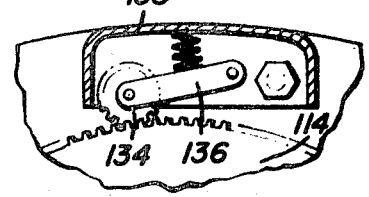
Herman F. Russell
INVENTOR.

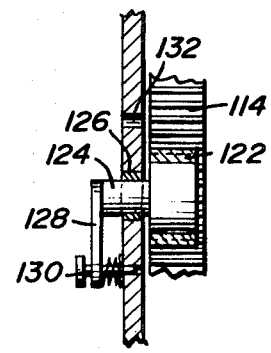
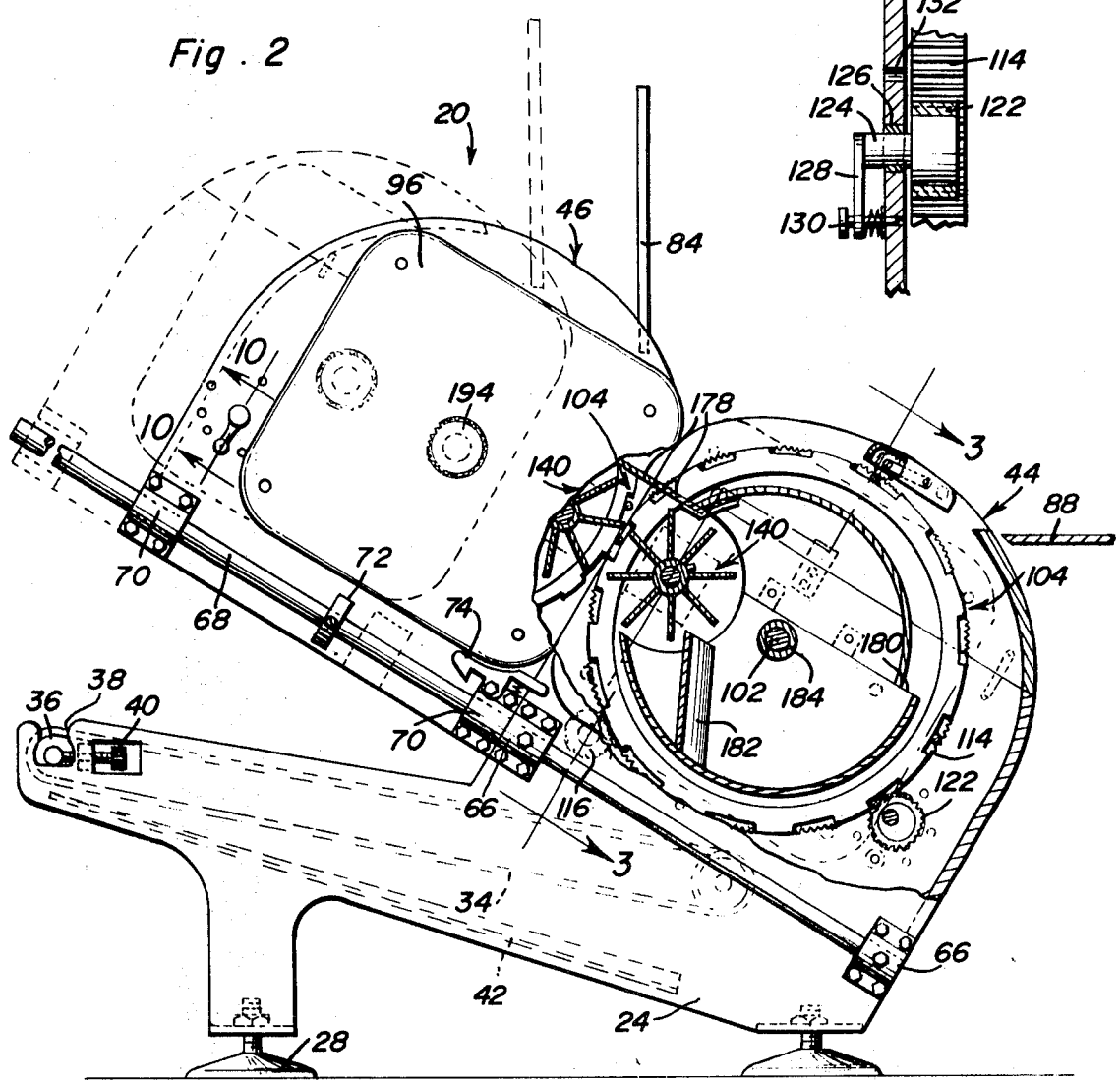
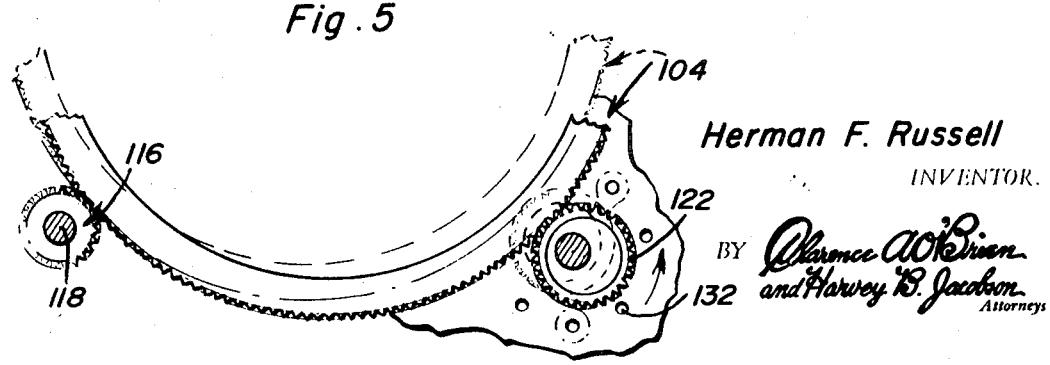

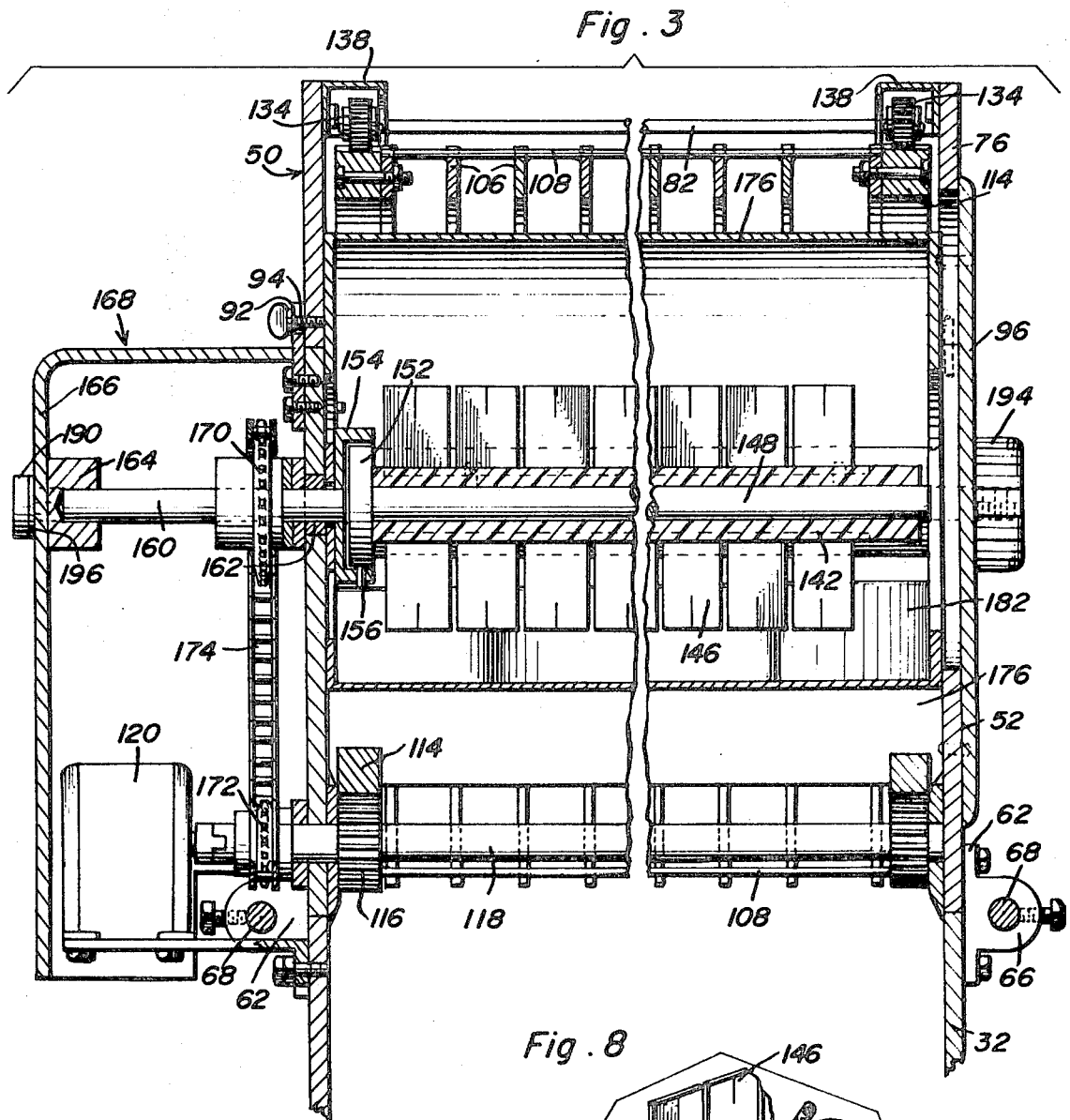
Fig. 3
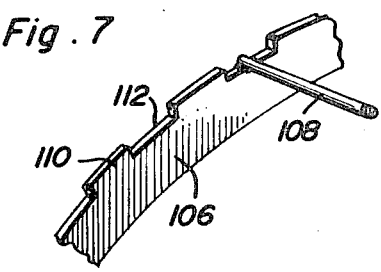
Fig. 8
Fig. 7
Herman F. Russell
INVENTOR.

United States Patent Office 3,606,628
Patented Sept. 21, 1971

3,606,628
TABLE MOUNTABLE MEAT CLEANING MACHINE
Herman F. Russell, 13900 Cherrylawn St., Detroit, Mich. 48238
Continuation-in-part of application Ser. No. 734,729, June 5, 1968, now Patent No. 3,478,380, which is a continuation-in-part of applications Ser. No. 583,206, Sept. 30, 1966, now Patent No. 3,389,414, and Ser. No. 704,971, Jan. 15, 1968, now Patent No. 3,439,369. Said application Ser. No. 704,971, being in turn a continuation-in-part of applications Ser. No. 570,616, Aug. 5, 1966, Ser. No. 583,206, Sept. 30, 1966, and Ser. No. 659,397, Aug. 9, 1967. This application Nov. 17, 1969, Ser. No. 877,229
Int. Cl. A22c 17/08
U.S. Cl. 15—3.17
15 Claims

ABSTRACT OF THE DISCLOSURE

A compact table mountable meat cleaning machine incorporating a pair of elongated sections, one mounted for lateral movement away from the other at an upwardly inclination relative thereto. Each of the sections mount a rotating wire-like gripping roller, the two rollers engaging and moving cuts of meat therebetween for a cleaning of the opposed sides thereof by a pair of elongated rotating brushes located within the rollers. The movable section is biased toward the other section by gravity whereby a constant pressure is maintained on a received cut of meat. A conveyor underlies the two sections for a removal of the cleaned meat. Scrap receiving containers are positioned within each roller and generally about the associated brush.

---

This is a continuation-in-part of application Ser. No. 734,729, filed June 5, 1968 and now Patent No. 3,478,380 for Automatic Meat Cleaning Apparatus, which is a continuation-in-part of application Ser. No. 583,206, filed Sept. 30, 1966 and now Patent No. 3,389,414 for Automatic Meat Handling and Cleaning Machine, and also a continuation-in-part of application Ser. No. 704,971, filed Jan. 15, 1968, now Patent No. 3,439,369 for Meat Cleaning Apparatus. Application Ser. No. 704,971 supra is in turn a continuation-in-part of application Ser. No. 583,206 supra and of abandoned application Ser. Nos. 570,616 and 659,397, filed Aug. 5, 1966 and Aug. 9, 1967, respectively.

The instant invention generally relates to new and useful improvements in machines for cleaning cuts of meat, and is more particularly directed to a compact table mountable unit which is self-adjusting for the accommodation of cuts of varying thicknesses and which provides a positive simultaneous cleaning of both faces of a received cut of meat for an automatic removal of bone dust, marrow, meat particles and the like so as to present a clean saleable product.

The machine of the instant invention is so orientated as to easily receive a cut of meat and automatically move the cut of meat through the cleaning process and subsequently discharge the cut of meat, also automatically, to a point outward of the machine. As such, the machine of the instant invention is particularly adapted for use in high speed, high volume situations, normally being positioned immediately adjacent a meat saw and orientated so as to discharge directly onto a cutting table whereby the operator of the meat saw need merely take the cuts of meat and deposit them, one at a time, into or against the receiving portion of the cleaning machine, the receiving portion of the cleaning machine allowing the introduction of the cuts of meat both rapidly and with little effort.

Basically, the machine of the instant invention includes a pair of elongated sections, each mounting a meat gripping and moving elongated roller or cylinder which move the meat downwardly between the sections. In addition, an upwardly rotating brush or scraper is mounted within each roller and projectable therethrough for engagement with the downwardly moving cut of meat. The sections are mounted on an inclination with the lower section being fixed and mounting a pair of upwardly inclined rods on which the upper section slides. The upper section is thus gravity biased toward the lower section so as to automatically adjust for the accommodation of meats of varying thickness, and also so as to maintain a constant pressure on a received cut of meat. A belt conveyor underlies the two sections and is so positioned as to receive a cleaned cut of meat and effect an outward discharge thereof. The rollers themselves are each formed of a series of laterally spaced ring-like members having peripheral meat gripping edges, these ring-like members being rigidly interconnected through a series of longitudinally extending connecting rods. The ends of the rollers mount ring gears by which a driving thereof is effected and, in the assembled machine, each roller is provided with a scrap receiving container extending longitudinally therethrough and mounted independently thereof in general surrounding relation to the brush or scraper.

These together with other objects and advantages which will become subsequently apparent reside in the details of construction and operation as more fully hereinafter described and claimed reference being had to the accompanying drawings forming a part hereof, wherein like numerals refer to like parts throughout, and in which:

FIG. 1 is a top plan view of the machine comprising the instant invention;

FIG. 2 is an elevational view of the machine with the front of one section broken away for purpose of illustration;

FIG. 3 is an enlarged cross-sectional view taken substantially on a plane passing along line 3—3 in FIG. 2;

FIG. 5 is a view detailing the adjustable support for one of the rollers;

FIG. 6 is a perspective view of one of the scrap trays or containers;

FIG. 7 is a perspective detail of a portion of one of the roller rings;

FIG. 8 is a perspective detail of the brush or scraper construction;

FIG. 9 is a cross-sectional detail of a spring loaded roller stabilizing gear taken substantially on a plane passing along 9—9 of FIG. 1;

FIG. 10 is an enlarged cross-sectional detail through one of the roller adjusting gears taken substantially on a plane passing along line 10—10 in FIG. 2; and FIG. 11 is an enlarged cross-sectional detail illustrating the cleaning flap on the forward edge of each scrap container.

Figure 4:
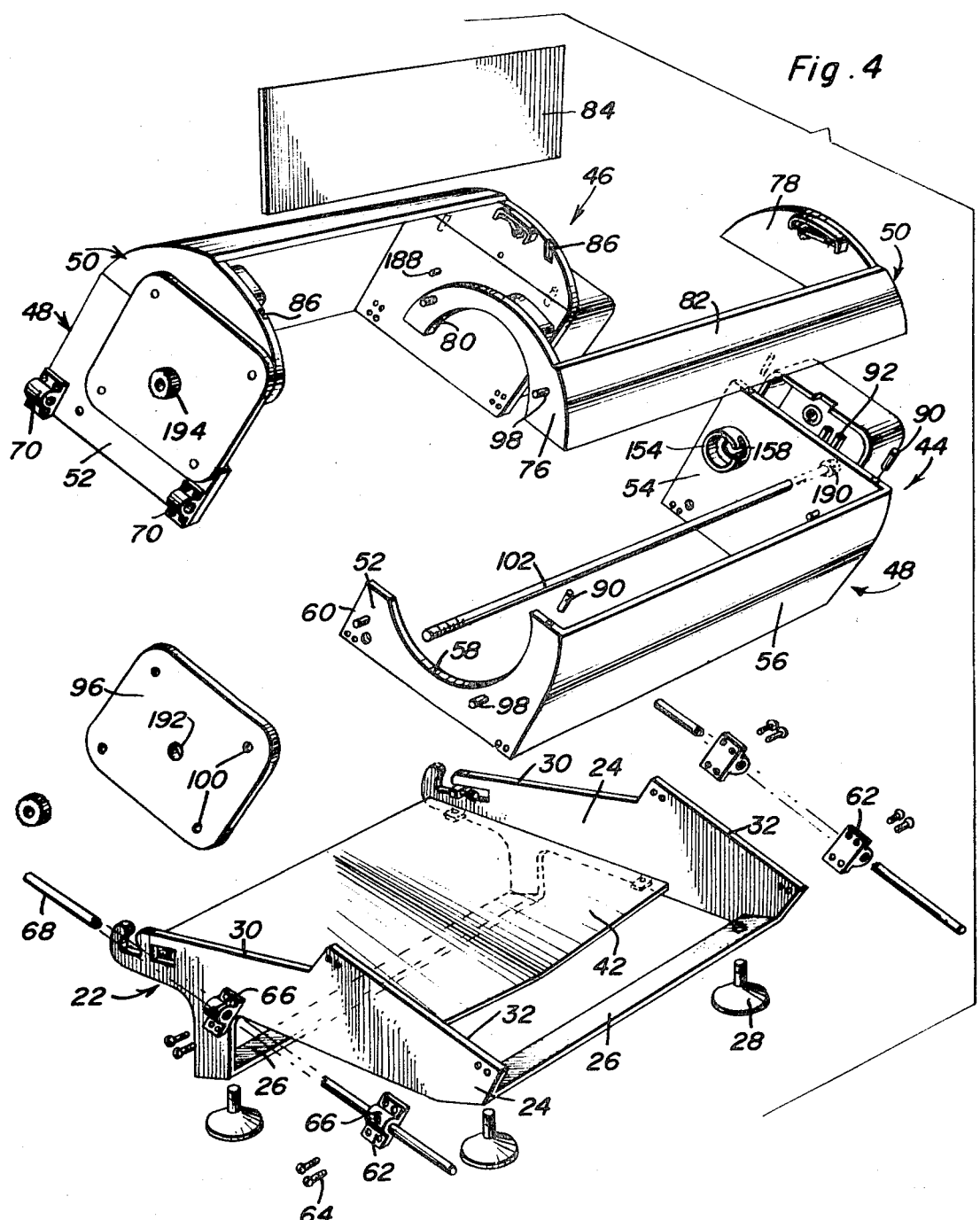
FIG. 4 is an exploded perspective view of the various structural components of the machine.

Referring now more specifically to the drawings, reference numeral 20 is used to generally designate the machine comprising the instant invention. Noting FIGS. 2 and 4 in particular, the machine 20 includes a base 22 formed of opposed side panels 24 interconnected by a series of rigid transverse straps 26 and supported by four adjustable feet 28. Each of the base side panels 24 includes an upper edge downwardly stepped at approximately the midpoint therealong so as to form a generally horizontal forward edge section 30 and an upwardly and forwardly inclined rear edge section 32 defining the inclination at which the actual cleaning units are to be orientated as shall be described presently. An endless belt conveyor 34 extends between the side panels 24 inwardly from the forward ends thereof to a point approximately three-quarters of the length of the panels 24 rearwardly thereof. The forward roller 36 of the conveyor 34 is adjustably mounted in a pair of receiving notches 38 by means of any appropriate belt tightening device 40. While no specific drive means has been illustrated for the conveyor belt 34, any conventional means can be utilized, it being contemplated in particular that a table mounted second conveyor be orientated immediately forward of the conveyor 34 for the reception of meat therefrom with the conveyor 34 being drivingly engaged with the second belt conveyor for a direct driving therefrom. Alternatively, drive means for the conveyor 34 can be provided directly within the machine 20. Underlying the conveyor 34 is an inclined drainage tray 42 orientated for a rearward directing of any draining fluids, including water in that an actual cleaning of the machine will normally involve only an occasional hosing thereof, the tray guiding the water along a specific path for a convenient collection thereof.

The cleaning operation is performed by and between lower and upper cleaning sections 44 and 46, said sections being of substantially duplicate construction and orientated in parallel facing relation to each other. Each of the cleaning sections 44 and 46 includes a housing formed in two portions, a lower portion 48 and a removable upper portion 50. The lower housing portion 48 includes a pair of end walls 52 and 54 interconnected by a transverse side wall 56. The far end wall 54 and the side wall 56 are of equal height, while the near end wall 52 includes an enlarged arcuate cut-out 58 therein and a shortened forward edge 60 for facilitating the mounting and removale of the cleaning components as shall be detailed subsequently.

The lower housing portion 48 of the lower cleaning section 44 sits on the inclined edge sections 32 of the base panels 24 so as to orientate the lower section 44 and the inclination thereof. This lower portion 48 is fixed to the base panels 24 by two pairs of brackets 62 overlying the near and far end walls 52 and 54 and the adjacent base panels 24, appropriate bolt means 64 being used to rigidly lock the lower section housing portion 48 to the base panels 24 through the brackets 62. Each pair of brackets 62 includes a pair of aligned sleeves 66 thereon. These sleeves 66 receives and rigidly mount an elongated rod 68 which extends upwardly at the angle of the edge section 32 and hence the lower cleaning section 44 for slidable reception through a pair of sleeves 70 mounted on the corresponding end wall of the upper cleaning section 46. It will of course be appreciated that two such rods 68 are provided, one on the near side of the machine and one on the far side of the machine so as to provide a firm sliding support for the upper cleaning section 46. It is contemplated that the actual inclination of the rods 68 be such so as to insure a positive gravity induced sliding movement of the upper section 46 downwardly against the lower section 44, while at the same time enabling an upward forcing of the upper section 46 upon the introduction of a cut of meat between the sections. It will be appreciated that the end walls 52 and 54 of the upper section housing portion 48 extends downwardly slightly relative to the corresponding end walls of the lower section 44 so as to enable a mounting of the sliding sleeves 70 in alignment with the rods 68. The downwardly offset edge sections 30 of the base panels 24 accommodate these slightly deeper end walls 52 and 54.

The near rod 68 includes a collar 72 fixed thereto between the two sleeves 70 on the upper section 46 which slidably receives the rod 68. This collar 72 constitutes a limit to the upward and outward movement of the upper section 46 and also cooperates with a spring loaded catch 74 mounted on the corresponding inner lower sleeve or sleeve bracket 70 for releasably retaining the upper section 46 in a withdrawn position so as to facilitate a cleaning of the machine. It will of course be appreciate that the spring loaded catch 74 engages behind the corresponding collar 72 upon an outward movement of the section 46 and can be easily released from this retained position through manual pressure on the catch 74 when it is desired to return the upper section 46 to operative condition relative to the lower section 44. Incidently, inasmuch as the upper section 46 is to move toward and away from the lower section 44 in response to the passage of a cut of meat therebetween, it is contemplated that actual engagement between the sections be cushioned by appropriate cushioning means, such as rubber bumpers provided at any convenient location for example along the meeting edges of the two housings.

The upper housing portion 50 of each section 44 and 46 includes a pair of end walls 76 and 78 in the shape of circle segments with the arcuate edge upwardly directed and the straight edge downwardly directed. The near end wall 76 is, in both instances, provided with a downwardly directed arcuate cut-out 80 which conforms to and forms a circular continuation of the cut-out portion 58 in the near end wall 52 of the corresponding lower housing portion 48. The upper portion end walls 76 and 78 are interconnected by a transversely extending side wall 82 which aligns with and forms a continuation of the corresponding side wall 56 of the lower portion 48. It will be noted that the upper portion side walls 82 are of a relatively low height so as to expose a substantial portion of the two sections 44 and 46 at the meeting faces thereof.

The upper portion 50 of the upper section 46 does differ in one aspect from the upper portion 50 of the lower section 44, this difference residing in the provision of a meat guiding back plate 84 orientated substantially vertically and extending transversely between the end walls 76 and 78 of the upper portion 50 of the upper section 46. This plate 84 has the opposite ends thereof vertically received within a pair of slots 86 defined in the inner faces of the opposed end walls with the plate 84 itself generally aligned with the meeting faces of the two sections 44 and 46 whereby meat positioned against the plate 84, or in fact thrown thereagainst, will slide and be guided downwardly between the two sections for engagement with the cleaning apparatus. In this manner, substantially no effort is involved in introducing the meat into the machine, such being easily effected by an operator of an adjoining meat saw located, as one example, to the right of the machine as illustrated in FIG. 2, reference numeral 88 indicating the saw table aligned with the open upper end of the lower section 44.

Each upper housing portion 50 is aligned with and locked to the corresponding lower housing portion 48 through the use of a series of connecting pins 90 which are received within alignable holes in the upper and lower edges of the housing portions. In addition, an upwardly projecting notched rigid strap 92 is affixed to the far end wall 54 of each housing with the notch therein upwardly directed for the reception of a bolt 94 threaded into the far end wall 78 of the corresponding upper portion 50. This bolt, noting FIG. 3 in particular, is, upon a seating in the notch of the strap 92, tightened so as to engage the strap and clampingly lock the upper portion 50 thereto. When it is desired to remove the upper portion 50, the bolt 94 is merely backed off and the upper portion vertically raised so as to expose the interior of the housing.

The near end walls 52 and 76 are also interlocked, and the circular opening therein selectively closed, by removable end plates 96. Each pair of end walls 52 and 76 is provided with outwardy projecting pins 98 thereon which align with pin openings 100 through the corresponding end plate for a mounting reception of the end plate in a manner whereby movement of the upper portion 50 away from the lower portion 48 is precluded. The end plate 96 is in turn fixedly secured by an elongated mounting rod 102 which extends longitudinally through the housing and which shall be described in more detail subsequently.

Positioned within and extending longitudinally through each section housing is an enlarged wire-like cylinder or cylindrical roller 104. The rollers 104 are formed of a series of laterally spaced coaxially aligned rings 106, which may be in the nature of flat blades, interconnected by a series of elongated rods 108 extending transversely across rings 106 and longitudinally of the roller 104 itself. Each of the rings 106, noting FIG. 7 in particular, includes an outer periphery having a series of alternating elongated projections and notches 110 and 112 defined therein so as to provide meat gripping teeth for a positive although non-damaging gripping of the face of a cut of meat.

The endmost gripping rings 106 on each roller 104 have a pair of annular gears 114 bolted, welded or otherwise rigidly affixed thereto so as to constitute a means for the mounting and driving of the rollers 104. Each roller 104 has the opposed end ring gears 114 seated on and meshed with drive gears 116 mounted adjacent the inner side of the corresponding housing on a common drive shaft 118 which extends longitudinally through the housing and beyond the far end wall 54 for coupled engagement with a motor 120. The end gears 114 also seat on a pair of adjustable gears 122 mounted in spaced relation to the drive gears 116 adjacent the outer side of the housing. The gears 122 are independent of each other and are individually adjustable so as to effect an adjustment in the orientation of the corresponding roller 104 as may be required in order to effect a proper gripping and cleaning of the meat. Noting FIGS. 5 and 10 in particular, it will be appreciated that the adjustment of each of the gears 122 is achieved through the provision of an eccentric shaft 124 thereon which extends through a bearing 126 in the adjacent housing end wall and mounts a crank handle 128 on the opposite end thereof. The outer end of the handle 128 mounts a spring-loaded pin 130 which is adapted to be selectively withdrawn and inserted into a series of holes 132 arcuately positioned about the shaft 124. In this manner, by rotatably adjusting the shaft 124 and the eccentrically mounted gear 122, a slight variation in the orientation of the wire-like roller 104 will be effected, such being generally indicated in FIG. 5. The gears 116 and 122 are mounted on the end walls of the lower housing portion. A third gear 134, associated with each end gear ring 114, is mounted on each end wall 76 and 78 of the upper housing portion. Each of the gears 134 is rotatably mounted on the end of a pivotally mounted arm 136 which is spring-biased downwardly so as to resiliently engage the gear 134 with the ring gear 114. This gear unit is mounted within a small housing 138 fixed to the corresponding end wall and opening downwardly so as to expose the gear 134 to the subjacent roller and ring gear 114. Thus, when it becomes necessary to remove one of the rollers 104 for any purpose, this can be easily effected by first removing the corresponding housing portion 50 and then merely lifting vertically the roller 104 from the housing.

Extending longitudinally through each roller 104, at approximately mid-height adjacent the inner face thereof, is an elongated brush or scraper unit 140. This brush 140 includes an elongated cylindrical sleeve 142 having a series of peripherally spaced elongated slots 144 which receive and mount a series of substantially full length flexible plastic or rubberized flaps 146 adapted to engage a piece of meat through the open body of the corresponding roller 104 and effect a cleaning thereof. With reference to FIGS. 3 and 8 in particular, it will be noted that the strips of material 146 are slit at equally spaced points therealong, these slits corresponding to the spacing between the roller rings 106 so as to allow for a passage of portions of the strip 146 therethrough for engagement with a cut of meat engaged and moved by the rollers 104. These strips 146, while being illustrated as secured within grooves, can of course be affixed to the sleeve 142 in any appropriate manner. The sleeve 142 itself is slid on and fixed to an elongated rigid shaft 148 by, as one example, a series of setscrews 150. The far end of the shaft 148 is provided with an enlarged head 152 thereon which is received within a socket 154 just inward of the far wall 54 of the lower housing portion 48. The enlarged shaft head 152 includes a laterally projecting pin 156 affixed thereon which is received within a bayonet slot 158 in the wall of the socket 154 so as to effectively lock the brush or scraper unit to the socket 154 for rotation therewith. The socket 154 is affixed to the inner end of an elongated shaft 160 which is rotatably received through a bearing 162 in the far end wall 54, the extreme outer end of the shaft 160 being rotatably received within a bearing 164 mounted on the side wall 166 of a cover or housing 168 affixed to the outer surface of the far end wall 154 for enclosing the drive means for the various operating components. This shaft 160 includes a gear 170 affixed thereto and driven from a similar gear 172 fixed to the drive shaft 118 by an endless chain 174. It will be appreciated that inasmuch as the roller 104 is driven through the meshed gears 116 and 114, the roller 104 and associated brush 140 will actually rotate in opposite directions, such being desired in that what is sought is a downward guiding and drawing of the cut of meat between the sections 44 and 46 in conjunction with an upward brushing of the particles from the opposed faces thereof. In this connection, it will be appreciated that the rollers 104 in the two sections 44 and 46 are located in opposed relation to each other and both operate so as to revolve inwardly and downwardly so as to cooperate in engaging and downwardly drawing a piece of meat. By the same token, the associated brushes 140 are in opposed relation to each other and operate inwardly and upwardly so as to effect a brushing of the downwardly moving meat.

Also positioned longitudinally through each of the open network cylindrical rollers 104 is an elongated generally cylindrical scrap collecting tray or container 176. This container 176, either integrally formed or made of separable upper and lower sections, opens inwardly toward the generally vertical path along which a cut of meat moves between the sections 44 and 46 and generally encloses the corresponding brush 40 whereby scraps and the like scraped or brushed from the meat by the brush 140 will be deposited within the container 176. An elongated flexible flap 178 is affixed to the upper longitudinal edge of the container defining the open portion in which the corresponding brush 140 projects. This flap includes a series of slits at selected points therealong for accommodating the moving roller rings 106 which pass therethrough, the flat 178 acting so as to clean the rings and retain any brushed particles within the container 176 itself. The outer longitudinal extent of each container 176 has the upper portion of the cylindrical wall inwardly offset from the lower portion of the cylindrical wall so as to define a full length access slot 180 which provides a means for easily cleaning the interior of the container 176 without, due to the overhanging nature of the break, interfering with the ability of the container 176 to completely collect the brush thrown scraps.

Extending longitudinally through each container 176, and projecting upwardly from the bottom thereof, is a full length barrier 182 which can be in the nature of an elongated rod or a plate-like wall as illustrated in the drawings. This barrier 182 follows a zigzag path and has the upper edge portion thereof orientated in the path of the brush flaps 146 for a sequential engagement of these flaps 146 therewith in a manner so as to cause a flexing of the flaps and a cleaning of any scraps or the like which may have been retained thereon. The purpose of the zigzag orientation of the barrier 182 is to provide for a gradual engagement of the flaps 146 therewith along the length of the flaps rather than a simultaneous engagement of the full length of each flap which would tend to adversely affect the rotation of the brush 140 and cause an erratic movement thereof.

Extending generally axially through each scrap container 76 is an elongated hollow tube 184 affixed to the opposed end walls and opening through aligned holes provided therein. The aforementioned elongated shaft 102, which mounts the cover panel 96, is received through the tube 184 and likewise mounts the scrap container 176. The far end wall of the scrap container 176 includes a second opening or hole 186 therethrough which receives a pin 188 fixed to the far housing wall 54 and projecting inwardly therefrom. In this manner, rotational movement of the container 176 is prevented, and the container 176 properly orientated within the corresponding roller 104 and about the corresponding brush 140. The shaft 102 itself includes, on the far end thereof, an enlarged head 190 which engages against the outer wall 166 of the motor housing 168, the shaft 102 passing completely through the corresponding section and out through a central aperture 192 in the corresponding cover plate 96 for the reception of an enlarged securing nut 194 on the threaded near extremity of the shaft 102. A suitable washer 196 can be provided on the shaft 102 immediately inward of the enlarged head 190 thereon so as to provide a frictional engagement of the shaft 102 and thereby simplify a proper tightening of the nut 104 so as to both mount the corresponding scrap container 176 and affix the corresponding cover plate 96. It will of course be recognized that a removal of each roller 104 will necessitate a prior removal of the corresponding shaft 102, scrap container 176 and brush 140, the scrap container and brush being removed through the enlarged circular opening provided in the near wall of the housing subsequent to removal of the cover plate 96.

From the foregoing, it will be appreciated that a highly unique meat cleaning machine has been defined. This machine is specifically adapted for the reception of cuts of meat of varying thicknesses, and the gripping of the cuts of meat for movement along a predetermined path, the cleaning of the opposed faces of the meat as it moves along the path, and the subsequent outward discharge of the cleaned meat. The scraps and the like cleaned from the meat are retained within removable containers. The actual structure involved consists of an inclined lower section and a slidably mounted upper section which is gravity biased toward the lower section so as to automatically adjust in response to meat introduced therebetween for the firm gripping of the meat regardless of variation in the thickness thereof. The actual gripping and moving of the meat is effected by a pair of opposed open network wire-like rollers which are driven inwardly and downwardly relative to each other so as to move the meat at a predetermined rate through the machine. A pair of opposed inwardly and upwardly rotating brushes are mounted within the rollers and have the brushing elements thereon and projecting through the rollers for engagement with the opposed faces of the moving meat. The brushes are in turn surrounded by scrap containers, located longitudinally within the corresponding rollers, for a reception of the scraps brushed from the meat. The various operating components of the machine are easily removed therefrom for cleaning purposes and in fact the structural components of the machine are also readily disassemblable for cleaning purposes should such be necessary, although the very nature of the machine and the arrangment of the components thereon adapt the machine for an effective cleaning without actually dismantling the machine, a drainage tray being provided so as to direct any cleaning fluid introduced into the upper portion of the machine to a central collection point such as an enlarged tank or pan. Incidently, it might be noted at this point that the stabilizing and support gears 122 and 134 associated with each of the meat gripping and moving rollers 104 can be in the nature of rollers as opposed to toothed gears should this be deemed desirable under certain circumstances.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A meat cleaning machine comprising a base, first and second cooperating cleaning sections on said base, said second section being orientated parallel to said first section and at an elevated position relative thereto, and means mounting said second section for gravity induced movement toward said first section and gravity resisted movement away from said first section along a predetermined path, said sections opening inwardly toward each other and defining a meat path therebetween, said sections including inwardly directed meat gripping and moving means for engaging and moving meat along said meat path, and inwardly directed meat cleaning means for engaging and cleaning meat moved along said meat path, the means mounting the second section for movement relative to the first section comprising a pair of elongated parallel rods fixed to said first section and projecting therefrom along the path of movement of the second section, and means slidably mounting said second section on said rods for movement of said second section therealong.

2. The machine of claim 1 wherein said gripping and moving means comprises an endless wire-like open network member mounted within each section and exposed inwardly toward the member mounted on the other section, and means for rotatably driving said endless members.

3. The machine of claim 2 wherein the drive means for each endless member comprises a pair of ring gears mounted on the opposed ends of the endless member and a series of support gears mounted within the corresponding section at the opposed ends thereof, said support gears seating and retaining the ring gears, one of said support gears comprising a powered drive gear.

4. The machine of claim 3 wherein each of said endless members consists of a series of laterally spaced coaxially aligned ring-like elements having generally notched peripheries so as to define gripping edges.

5. The machine of claim 4 wherein said meat cleaning means comprises a series of elongated flexible flaps fixed to and extending longitudinally along an elongated central member, said flexible flaps being orientated at generally equal points peripherally about the central member, and means rotatably mounting one such cleaning means within each section for an exposure thereof inwardly of the corresponding section and a sequential engagement of the flaps with meat moving along the meat path.

6. The machine of claim 5 including an elongated inwardly opening hollow scrap container in each section, said scrap container generally surrounding the corresponding cleaning means and being enlarged inwardly thereof for a reception of the scraps removed from the meat by the flaps.

7. The machine of claim 6 wherein, in each section, the cleaning means is located within the meat gripping and moving means, with the cleaning means flaps selectively projecting laterally therethrough for engagement with the meat moved thereby, the associated scrap container also being located generally centrally within the meat gripping and moving means and fixed relative to movement of the meat gripping and moving means thereabout.

8. The machine of claim 7 including an elongated member mounted within each scrap container and presenting an irregular upper edge in the path of movement of the flaps of the associated cleaning means for a sequential engagement of the flaps thereagainst in a scrap dislodging manner.

9. The machine of claim 8 wherein each of said sections includes a housing generally enclosing the meat gripping and moving means and the cleaning means, each housing comprising separable upper and lower housing portions, means for interlocking said housing portions, and means for locking the lower housing portion to the base, said base including an outwardly directed endless conveyor generally underlying the meat path for reception of the cleaned meat therefrom.

10. A meat cleaning machine comprising a supporting structure, a pair of parallel laterally spaced elongated cylindrical members rotatably mounted on said supporting structure and defining a path therebetween for movement of meat herealong by said cylindrical members, each cylindrical member comprising an open body defined by a plurality of spaced gripping wire-like members, means for rotating said cylindrical members inwardly toward each other, an elongated brush-like cleaning member mounted within each cylindrical member and selectively projecting inwardly therethrough into the meat path, means for rotatably driving each brush-like member, and an elongated scrap container mounted within each cylindrical member in generally surrounding relation to the brush-like member for the reception of the brushed scraps therefrom, said scrap container being mounted independently of the cylindrical member and brush-like member so as to not interfere with the driving thereof.

11. The machine of claim 10 including means for mounting one of said cylindrical members and the associated brush-like member and scrap container for selective movement toward and away from the second cylindrical member whereby a variation in the width of the meat path can be effected.

12. The machine of claim 10 including an elongated member mounted within each scrap container and presenting an upper edge extending along an irregular line generally transversely across the rotational path of the corresponding brush-like member for an irregular engagement therewith.

13. A meat cleaning machine comprising a base, first and second cooperating cleaning sections on said base, said second section being orientated parallel to said first section and at an elevated position relative thereto, and means mounting said second section for gravity induced movement toward said first section and gravity resisted movement away from said first section along a predetermined path, said sections opening inwardly toward each other and defining a meat path therebetwen, said sections including inwardly directed meat gripping and moving means for engaging and moving meat along said meat path, and inwardly directed meat cleaning means for engaging and cleaning meat moved along said meat path, said cleaning means comprising in each section, a plurality of elongated flexible flap-like portions fixed to and along an elongated rod-like central member, said flap-like portions being orientated at generally equally spaced points thereabout for sequential projection into said meat path and engagement with meat moving therealong, an elongated inwardly opening hollow scrap container in each section, said scrap container generally surrounding the corresponding cleaning means and being enlarged inwardly thereof for a reception of the scraps removed from the meat by the flap-like portions, and an elongated member mounted within each scrap container and presenting an upper edge extending along a generally zig-zag path for sequential progressive engagement of the flap-like portions therewith upon a rotation of the cleaning means, and means for rotatably driving said cleaning means.

14. The machine of claim 13 wherein said gripping and moving means comprises an endless member mounted within each section and consisting of a series of laterally spaced coaxially aligned ring-like elements having irregular peripheries so as to define gripping edges, each scrap container having an elongated flap fixed thereto and projecting therefrom, said flap having a series of slits therein corresponding to and receiving the ring-like elements, and means for rotatably driving said endless members whereby a continuous cleaning of the ring-like elements by the flap is effected.

15. A meat cleaning machine comprising a base, first and second cooperating cleaning sections on said base, said second section being orientated parallel to said first section and at an elevated position relative thereto, and means mounting said second section for movement toward said first section and movement away from said first section along a predetermined path, said sections opening inwardly toward each other and defining a meat path therebetween, said sections including inwardly directed meat gripping and moving means for engaging and moving meat along said meat path, and inwardly directed meat cleaning means for engaging and cleaning meat moved along said meat path said gripping and moving means comprising a cylindrical member mounted within each section and exposed inwardly toward the member mounted within the other section, means for rotatably driving said cylindrical members, each of said sections including a housing generally enclosing the cylindrical member, each housing comprising separable upper and lower housing portions, means for releasably interlocking said housing portions, said drive means for each cylindrical member comprising a pair of ring gears mounted on the opposed ends of the cylindrical member, a pair of support gears mounted on the lower housing portion for the seated reception of each ring gear, and a third gear associated with each ring gear and mounted on the upper housing portion for retaining engagement with the ring gear upon a mounting of the upper housing portion on the lower housing portion, each cylindrical member being upwardly removable from the lower housing portion upon a removal of the upper housing portion and the retaining gears thereon.

References Cited

UNITED STATES PATENTS

| | | | |
|---|---|---|---|
| 1,050,298 | 1/1913 | Rowland | 15—3.17 |
| 2,817,862 | 12/1957 | Frazho et al. | 15—3.17 |
| 3,102,290 | 9/1963 | Sanhes | 15—3.17 |
| 3,478,380 | 11/1969 | Russell | 15—3.17 |

EDWARD L. ROBERTS, Primary Examiner

U.S. Cl. X.R.

15—77